D. E. HURTIG & F. L. HAGGART.
ATTACHMENT FOR HEADERS AND HEADER BINDERS.
APPLICATION FILED JULY 9, 1917.

1,259,991.

Patented Mar. 19, 1918.
2 SHEETS—SHEET 2.

WITNESSES

INVENTOR
David E. Hurtig
Frank L. Haggart
BY

ATTORNEYS

UNITED STATES PATENT OFFICE.

DAVID E. HURTIG AND FRANK L. HAGGART, OF DELPHOS, KANSAS.

ATTACHMENT FOR HEADERS AND HEADER-BINDERS.

1,259,991.  Specification of Letters Patent.  Patented Mar. 19, 1918.

Application filed July 9, 1917. Serial No. 179,383.

*To all whom it may concern:*

Be it known that we, DAVID E. HURTIG and FRANK L. HAGGART, citizens of the United States, and residents of Delphos, in the county of Ottawa and State of Kansas, have invented certain new and useful Improvements in Attachments for Headers and Header-Binders, of which the following is a specification.

Our invention is an improvement in headers and header binders, where the header is propelled by a motor driven drive shaft extended centrally and longitudinally with the trend of the header, and the invention has for its object to provide mechanism of the character specified capable of being attached to existing machinery of the harvester type, as, for instance, headers and binder headers, for connecting the wheels of the cutting and binding mechanism of the harvester to a motor driven shaft, as used in connection with a self-propelled machine.

Figure 1:
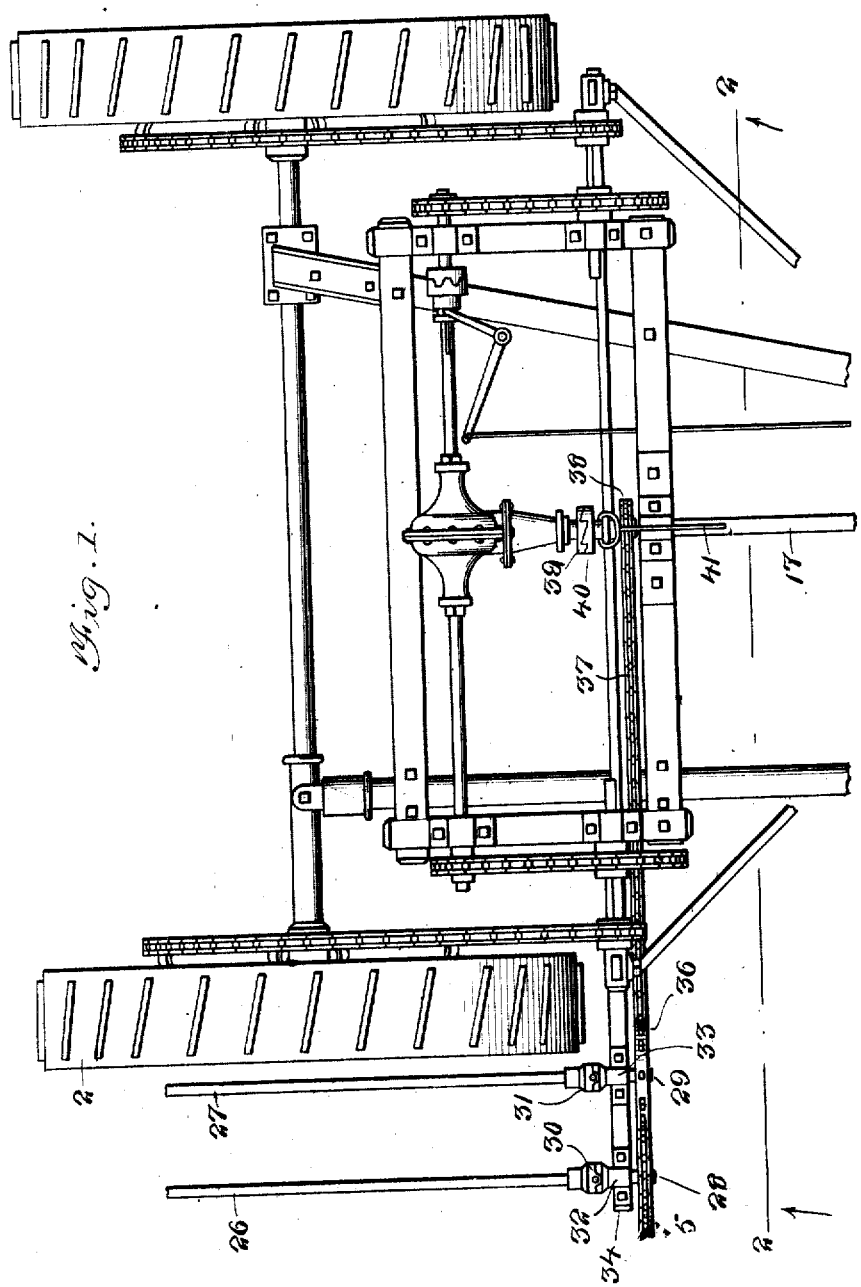
Figure 1 is a top plan view of the transmission mechanism in connection with a header.
Figure 2:
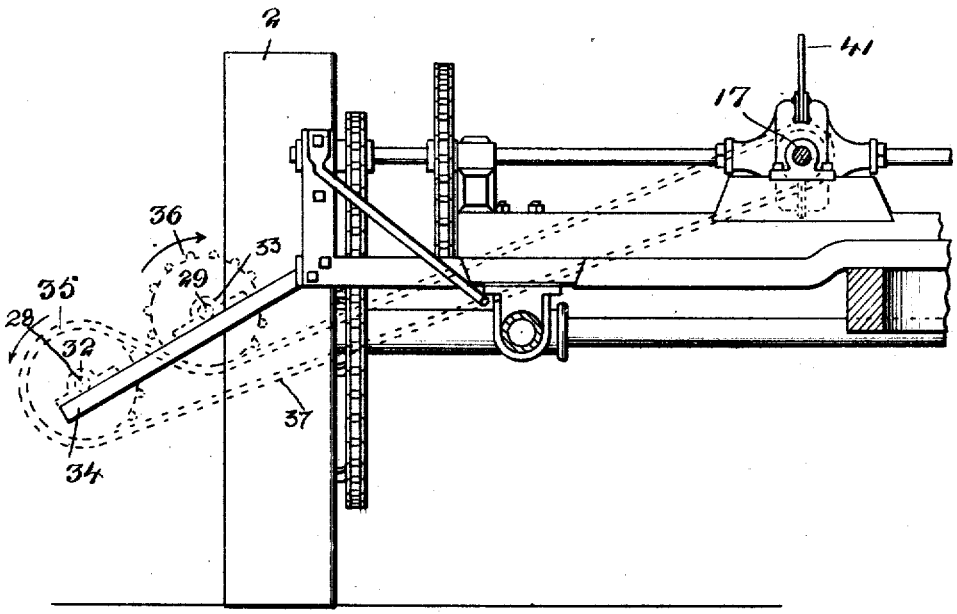
Fig. 2 is a section on the line 2—2 of Fig. 1, looking in the direction of the arrows adjacent to the line.

In the present embodiment of the invention, the shaft 26 which drives the sickle or cutter of the binder, and the shaft 27 which drives the canvas or draper of the binder, are arranged at the outer side of one of the drive wheels 2 and at their rear ends these shafts are coupled to shafts 28 and 29, respectively.

The stub shafts 28 and 29 are journaled in bearings 32 and 33, respectively, and on the extension 34 from the frame, and each of the said stub shafts is provided with a sprocket wheel at its rear end.

The sprocket wheel 35 on the stub shaft 28 and the sprocket wheel 36 on the stub shaft 29, are driven by a common sprocket chain 37, which engages also a sprocket wheel 38 journaled loosely on the motor driven shaft 17. The chain 37 is an endless chain, passing over the wheels 35 and 38, and the upper run of the chain passes beneath the wheel 36. Hence when the motor shaft is driven, the wheels 35 and 36 will be driven in opposite directions by the endless sprocket chain.

The sprocket wheel 38 is, as before stated, loose on the shaft 17, and it may be clutched to the said shaft by means of a clutch consisting of a fixed section 39 on the motor driven shaft, and a loose section 40 which is mounted to slide on the motor driven shaft and is rigid with the sprocket wheel 38.

A lever 41 is provided for moving the clutch section 40 and the sprocket wheel 38, the lever being mounted in the usual manner and having a fork whose arms engage an annular groove in the section 40.

The propelling wheels 2 of the machine may be driven from the motor, which is supported at the rear of the machine frame, and which drives the shaft 17, or the said wheels may be disconnected from the motor and the shafts 26 and 27 connected therewith. Thus either the propelling wheels, the operating mechanism or both may be connected with the motor.

In moving the binder on the highway or to position, the operating mechanism, namely, the shafts 26 and 27 are disconnected at clutch 39—40. In use, the binder operates in precisely the same manner as the ordinary binder, with the exception that the binding mechanism may be run independently until the canvas draper be cleared from cut grain after the propelling motion has come to a stand.

We claim:

In combination with two longitudinally arranged shafts for driving the cutting and binding mechanism of a heading or harvesting machine and a motor-driven propelling shaft also longitudinally placed, sprocket wheels secured to the two longitudinally arranged shafts in the same transverse plane, a drive chain passing around the extreme sprocket wheel and beneath the intermediate sprocket wheel to drive the said two longitudinally arranged shafts in opposite directions, and a clutch connection on the motor driven shaft together with a driving sprocket wheel and a shifting lever on said motor driven shaft, the sprocket wheel secured to the motor shaft being in the same transverse plane with the other sprocket wheels, the drive chain passing around the sprocket wheels of the motor driven shaft and the outer longitudinal shaft and beneath the sprocket wheel of the inner longitudinal shaft.

DAVID E. HURTIG.
FRANK L. HAGGART.

Witnesses:
J. B. RICHARDS,
CELIA NIGH.